J. C. RANKIN.
Liquid Measure.
No. 28,690.
Patented June 12, 1860.
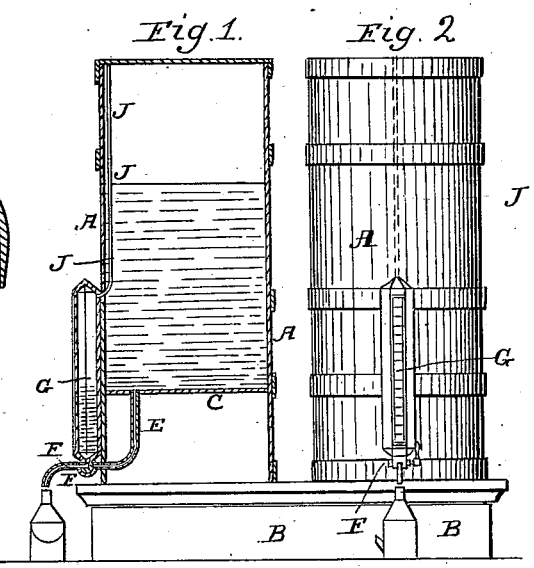
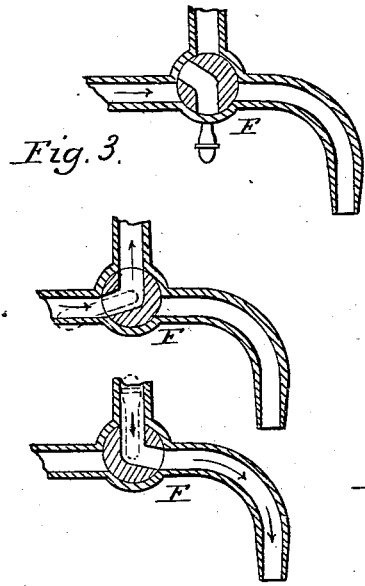
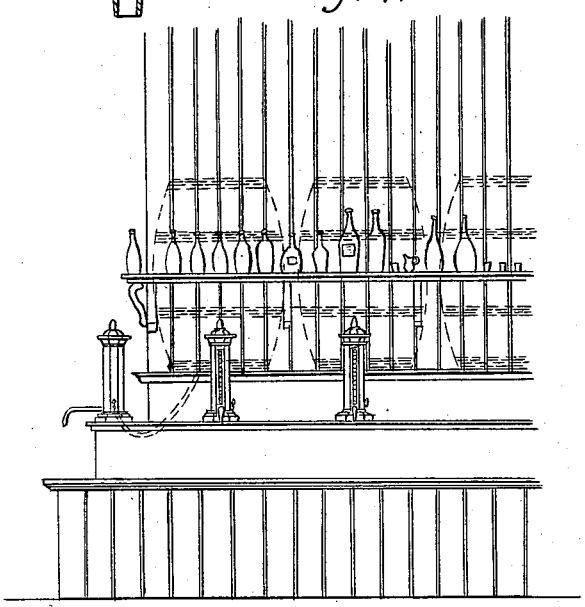
Witnesses:
Inventor.

UNITED STATES PATENT OFFICE.

JOHN C. RANKIN, OF MOUNT VERNON, NEW YORK.

APPARATUS FOR MEASURING LIQUIDS.

Specification of Letters Patent No. 28,690, dated June 12, 1860.

*To all whom it may concern:*

Be it known that I, JOHN C. RANKIN, of Mount Vernon, in the county of Westchester and State of New York, have invented a new and useful Device for Measuring Liquids; and I do hereby declare that the following is a full, clear, and exact description thereof, reference being had to the accompanying drawings, forming a part of this specification, in which—

Figure 1 represents a vertical diametrical section taken through an ordinary oil can, with the measuring gage attached, showing the operation of measuring the liquid. Fig. 2 is a front view of the can. Fig. 3 are views of the two way cock showing the three positions of the stem of the same. Fig. 4 illustrates the application of my device to liquor barrels for retailing liquor in small quantities, where the barrels are hidden from view.

Similar letters of reference indicate corresponding parts in the several figures.

My invention can be applied to a bar room so that the gages can be permanently fixed to the counter, with pipes communicating with the casks of liquor, which may be situated behind a partition out of sight, or the gages may be attached to the casks by flexible tubes so that they can be moved about on the counter, or shelf behind the counter, for the convenience of the attendant, and these gages may be made highly ornamental, and in a variety of designs according to their requirements.

My invention consists in attaching to the top of a two-way cock a vessel composed of metal and having a glass face, or a glass cylinder may be used, with suitable marks on its face for indicating the several quantities of liquid to be measured therefrom. This device when properly constructed and graduated constitutes the gage which is attached with the cock to the bottom of the reservoir containing the liquid through which pipe the liquid passes to the gage to be measured. The top of said gage communicates with the space above the liquid in the barrel for permitting the air from said gage to escape above the liquid in the barrel as the liquid escapes into the gage, thus keeping the parts tight and at the same time permitting the liquid to flow into and from the gage, freely, described as follows.

By reference to Figs. 1 and 2, A, represents a stationary oil can, mounted upon a stand B. The bottom of the can is shown by C, which is some distance above the level of the stand B. From this bottom proceeds a pipe E, which communicates with a two-way cock F, these are shown in section by Fig. 3, which cock is situated below the bottom C, of the can for the purpose of measuring the oil with equal facility when it has nearly all run out of the can.

G is the gage which may be a cylinder of glass or a metal box with a glass face, the bottom of which is screwed to the top of the two-way cock F, as shown by Figs. 1 and 2, so that by turning the stem of the cock in one direction the liquid will flow from the can A, through pipe E, and up into the gage G. The face of this gage, is furnished with marks indicating gills, pints, quarts, and gallons according to its capacity, which can be read off, as the liquid is rising in the gage, and when the desired quantity has been thus measured the stem of the cock F is turned one quarter round which shuts off the flow into the gage and discharges the measured quantity through the cock into the vessel for receiving it. The top of the gage communicates with the inside of the oil can, above the liquid therein by a pipe J, which permits the air in the gage to escape while the liquid takes its place. Pipe J, also serves as a safety pipe to prevent the loss of the liquid by overflow of the gage in case the admission cock to the gage G, is left open too long. If the cock should be left open after the gage is filled the liquid would rise in pipe J, until it had reached the level of the contents of the barrel.

I have shown by Fig. 3, the two-way cock with the stem of the same in the three positions the stem is placed in. The first is where the liquid is cut off both from the barrel and gage so as to prevent flies or other insects from getting into the gage, and for keeping the gage clean. The second view shows the position of the stem when the liquid is being measured and the third view of the cock shows the stem in a position for drawing the liquid from the gage after it has been measured.

I have described the manner of drawing and measuring oil from stationary cans, but I contemplate applying my invention for measuring liquors from casks and for any or every kind of liquid where it is to be retailed in small quantities, in which case the principle of operation remains the same as that herein described.

I have shown by Fig. 4, of the drawings the application of my gage to liquor barrels where the gage is represented resting upon a shelf with a pipe communicating with the bottom of the barrel, which is elevated above the gage and placed out of sight behind a partition. The gages may be here ornamented and the pipe may be flexible so that they may be moved from place to place as circumstances may require. When all the liquor has been drawn from the barrel another may be placed in its stead or the same barrel may be refilled.

What I claim as my invention and desire to secure by Letters Patent, is

The arrangement in combination with the gage G, and case A, pipe E, and two way cocks E, of the safety air pipe J, as and for the purpose herein shown and described.

JNO. C. RANKIN.

Witnesses:
W M. TUSCH,
R. S. SPENCER.